June 17, 1930.   W. J. MISKELLA   1,764,083
COLOR GUIDE
Filed March 5, 1928
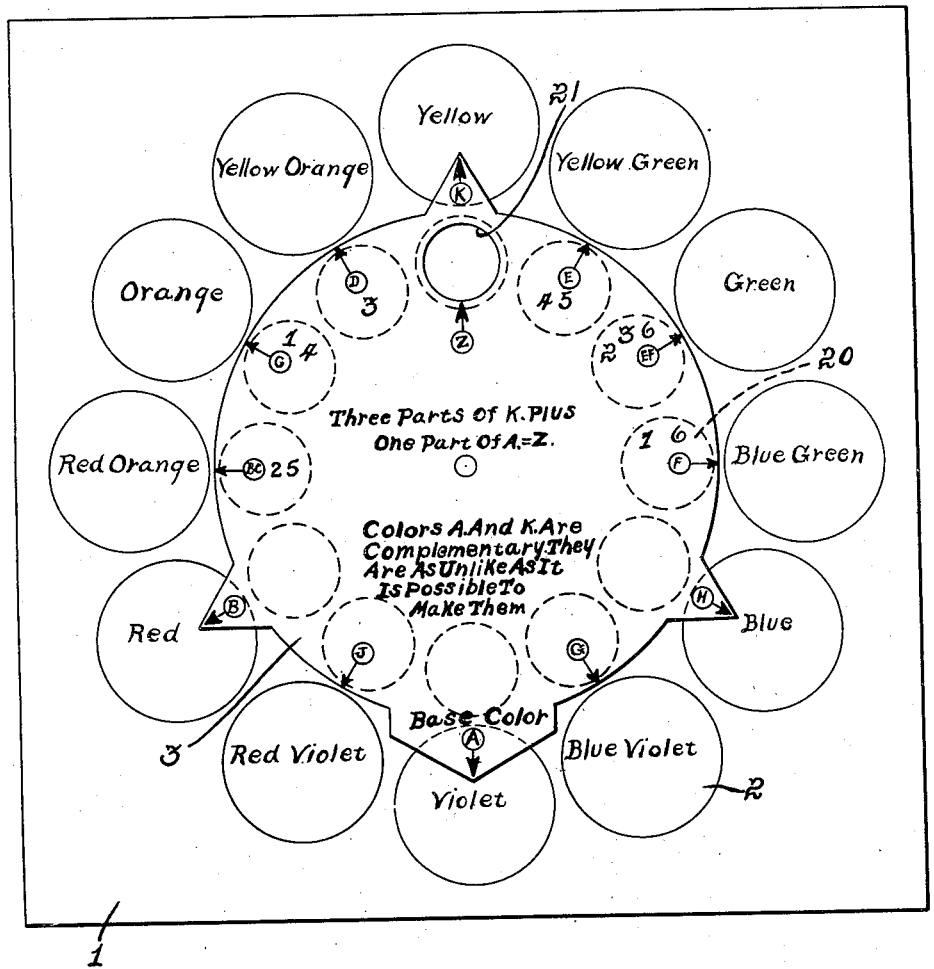

Patented June 17, 1930

1,764,083

UNITED STATES PATENT OFFICE

WILLIAM J. MISKELLA, OF OAK PARK, ILLINOIS

COLOR GUIDE

Application filed March 5, 1928. Serial No. 259,156.

This invention relates to devices for selecting and mixing colors, but more particularly to charts or guides to visibly indicate the relationships between colors.

It is a desideratum that a device be produced which will enable an unskilled person readily to select or choose colors which are harmonious, and also those colors which can be properly mixed together. Such device is usable in a variety of situations, such as window trimming, automobile painting, dressmaking, and wherever different colors are to be associated or mixed. Without a guide or chart of this character, it is manifest that with persons without artistic ability and unskilled in the choosing and harmonizing of colors, unsightly results not infrequently occur.

An object of this invention is to provide a novel chart or guide for visibly indicating the relationships between a variety of colors having adjustable means to determine conveniently the relationship between a particular color and the remainder.

Another object is to provide a simple and efficient color guide which readily indicates groups of colors which are harmonious and may properly be displayed together, and those colors that are discordant or unharmonious.

A further object is to provide a color guide which readily indicates the result of mixing together certain colors in definite proportions.

Other objects of the invention will hereinafter appear.

The invention is shown by way of illustration in the accompanying drawing, in which:

The figure is a plan view of a color guide embodying the invention.

The illustrated embodiment of this invention comprises a card or sheet 1 of rectangular form having a circular series 2 of differently colored discs, which are of substantial size. The colors of the chromatic circle 2 have a definite arrangement with respect to each other, such that diametrically opposed colors are complementary, that is, they are as unlike as it is possible to make them. The relation between adjacent colors will hereinafter be described.

Within the chromatic circle 2 and pivoted concentrically thereof is an indicator 3 having opposed pointers A and K and pointers B and H on opposite sides of the pointer A. The indicator is of substantially circular form, and the outer edge is positioned in close proximity to the discs of the circle 2.

The pointer A indicates the base color, and, as above mentioned, the disc diametrically opposed to the color indicated by the pointer A, is complementary thereto. For example, the pointer A on the drawing designates the violet disc, this being the base color. Directly opposed to the violet disc is the yellow disc indicated by the pointer K; hence, yellow and violet are complementary, or are as unlike as it is possible to make them, and should never be associated together, because they do not harmonize. Regardless of the position of the indicator 3, the pointers A and K will always designate complementary colors due to the arrangement and selection of the colors displayed on the discs, as will be apparent from the drawing.

A letter on the indicator 3 designates each disc in the circle 2. As shown, reading in a clockwise direction from the pointer A, the letters appear successively, as follows: J, B, BC, C, D, K, E, EF, F, H and G. For purposes of enabling ready selection of colors, an arrow is associated with each letter, and all arrows are of one color, for example, red, with the exception of the arrows associated with the letters H, J and K, which are of a different color, as green.

In each position the indicator may assume the colors designated by the letters H, J and K, do not harmonize with the base color A. For illustration, the colors blue, red violet and yellow indicated respectively by the letters H, J and K, do not harmonize with the color violet, indicated by the letter A. These colors should never be displayed together, as the result would be discordant.

As a convenient means for selecting groups of harmonious colors like numbers are placed adjacent different letters, and these like numbers designate colors which harmonize with the base color A. As shown, numbers 2, 5 are adjacent the letters BC; 1, 4 adjacent the letter C; 3 adjacent the letter D; 4, 5 adjacent the letter E; 2, 3, 6 adjacent the letters EF; and 1, 6 adjacent the letter F.

This arrangement of numbers enables one at a glance to select several harmonious color combinations. Like numbers may be properly associated for harmony with the base color, and it will be observed that there are sets of two like numbers in the arrangement. For example, there are two numbers 2, and, regardless of the position of the indicator, the colors indicated by these numbers may be harmoniously combined with the base color designated by the letter A. This provides several groups of colors which may be properly combined to produce an esthetic three color effect. In addition, the colors indicated by the letters G and B also harmonize with the base color A, regardless of the position of the indicator, and may be added to any three color group formed as described.

This is due to the arrangement of the colors, and, as the indicator is positioned, the colors red and blue violet will harmonize with the base color violet. This harmonizing effect will be true regardless of the position of the indicator, and in each position the colors indicated by the letters G and B will harmonize with the base color indicated by the letter A.

Within the chromatic circle 2 is a circle 20 of differently colored discs which are equal in number to those in the outer circle, a disc in the inner circle being in corresponding relation to a disc in the outer circle. As shown, the discs in the circle 20 are somewhat smaller than the outer discs. The colors of the discs of the inner circle are so chosen that they may be produced by properly mixing in a definite manner the corresponding complementary colors.

In explanation, it will be noted that the following appears on the indicator 3: "Three parts of K plus one part of A=Z". Thus, when the base color A is violet, three parts of yellow (complementary to violet) plus one part of violet equals the color of the disc of the inner circle 20, designated by the letter Z appearing on the indicator, which corresponds to the yellow disc of the outer circle 2.

Adjacent the pointer K in position to register with a disc of the inner circle 20 and formed in the indicator 3 is a sight opening 21 to which the arrow of the letter Z points. It is manifest that in any position of the indicator, when the letter A designates one color, the combination of the base color with its complementary color in the proportions directed produces the color visible through the sight opening 21. In this manner one is enabled readily to determine the color resultant from a mixture of the complementary colors without experimentation. Only one color of the inner circle 20 is visible at one time, because the indicator covers the remaining discs of that circle.

A color guide as above described has a variety of uses, among which are the selection of harmonious colors for automobile bodies, for dresses, for window trimming, for advertising posters and for numerous other purposes where the choosing of colors is required. Furthermore, this guide is of service to painters, artists, and others who are repeatedly mixing colors and desire a convenient chart to assist them in readily ascertaining what colors combine to produce a desired color or shade.

Numerous changes in details of construction and arrangement may be effected without departing from the spirit of the invention, especially as defined in the appended claims.

What I claim as new and desire to secure by Letters Patent is:

1. A color guide comprising a series of different colors arranged in a circle, an indicator pivoted concentrically of said circle, and symbols on said indicator arranged in such manner that in any position of the indicator like symbols indicate the relationships between the colors to which they correspond.

2. A color guide comprising a series of different colors arranged in a circle, an indicator pivoted concentrically of said circle, and indicia in the form of like numbers on said indicator arranged in such manner that in any position of said indicator like numbers indicate the relationships between the colors to which they correspond.

3. A color guide comprising a series of different colors arranged in a circle, an indicator pivoted concentrically of said circle, and indicia in the form of like numbers on said indicator arranged in such manner that in any position of said indicator like numbers indicate the harmonizing relationships between the colors to which they correspond.

4. A color guide comprising two concentric series of colors arranged in circles, and an indicator pivoted concentrically of said circles, the colors of said series being so chosen and arranged that opposed portions of said indicator indicate complementary colors in one circle and the color in the other circle correspondingly arranged to one complementary color is obtainable by mixing in certain proportions said complementary colors.

5. A color guide comprising two concentric series of colors arranged in circles, an indicator pivoted concentrically of said circles having opposed portions overlapping the inner circle, said indicator having a sight opening through which a color of the inner circle may be visibly displayed, the colors of said series being so chosen and arranged that opposed portions of said indicator designate complementary colors in the outer circle and the color in the inner circle visible through said sight opening is obtainable by mixing said complementary colors.

6. A color guide comprising two concentric series of colors arranged in circles, an indicator pivoted concentrically of said circles, an indicia on said indicator for indicating the colors in one circle, the colors of said last circle and indicia being so arranged that in any position of said indicator, one or more groups of harmonizing colors will be indicated by the relation of the indicia to the colors, and opposed portions of said indicator indicate complementary colors, said indicator having a sight opening through which a color of the other circle may be visibly displayed, the colors of said inner circle being so chosen and arranged that the color visible through said sight opening is obtainable by mixing said complementary colors.

7. A color guide comprising a plurality of rows of colors, and an indicator movable with respect to said rows, the colors of said rows being so chosen and arranged that opposed portions of said indicator designate complementary colors in one row and the color in another row correspondingly arranged to one complementary color is obtained by mixing in certain portions said complementary colors.

In testimony whereof I have hereunto signed my name to this specification.

WILLIAM J. MISKELLA.